(12) United States Patent
Membreno et al.

(10) Patent No.: US 9,443,497 B1
(45) Date of Patent: Sep. 13, 2016

(54) TIME DISPLAY FOR A TUNING DEVICE

(71) Applicant: Onboard Research Corporation, Carrollton, TX (US)

(72) Inventors: Agustin J Membreno, Plano, TX (US); Arthur David Harvey, Dallas, TX (US)

(73) Assignee: Onboard Research Corporation, Farmers Branch, TX (US)

( * ) Notice: Subject to any disclaimer, the term of this patent is extended or adjusted under 35 U.S.C. 154(b) by 0 days.

(21) Appl. No.: 14/593,972

(22) Filed: Jan. 9, 2015

(51) Int. Cl.
*G10G 7/02* (2006.01)
*G06F 3/16* (2006.01)

(52) U.S. Cl.
CPC ............... *G10G 7/02* (2013.01); *G06F 3/162* (2013.01)

(58) Field of Classification Search
CPC ....................................................... G10G 7/02
See application file for complete search history.

(56) References Cited

U.S. PATENT DOCUMENTS

| | | | | |
|---|---|---|---|---|
| 4,368,989 A | * | 1/1983 | Kawashima | G04G 13/02 368/273 |
| 4,388,000 A | * | 6/1983 | Hagihira | G04G 9/0064 368/239 |
| 4,474,480 A | * | 10/1984 | Kato | G04C 3/00 368/223 |
| D402,684 S | | 12/1998 | Wilson et al. | |
| 6,201,769 B1 | * | 3/2001 | Lewis | G04F 5/025 368/10 |
| 6,653,543 B2 | | 11/2003 | Kulas | |
| 6,965,067 B2 | | 11/2005 | Kondo | |
| 7,259,311 B2 | * | 8/2007 | Ashida | G10G 7/02 84/454 |
| 7,265,282 B2 | | 9/2007 | Membreno et al. | |
| 7,371,954 B2 | * | 5/2008 | Masuda | G10G 7/02 84/454 |
| 7,390,951 B2 | * | 6/2008 | Dulaney | G10G 7/02 84/454 |
| 7,521,618 B2 | * | 4/2009 | Okuyama | G10G 7/02 84/454 |
| 7,547,838 B2 | * | 6/2009 | Okuyama | G10G 7/02 84/454 |
| 7,663,043 B2 | * | 2/2010 | Park | G10G 7/02 84/454 |
| 8,811,121 B2 | * | 8/2014 | Balli | G04G 21/00 368/10 |
| 2005/0204897 A1 | | 9/2005 | Adams et al. | |
| 2005/0204898 A1 | * | 9/2005 | Adams | G10G 7/02 84/454 |
| 2012/0243379 A1 | * | 9/2012 | Balli | G04G 21/00 368/10 |

* cited by examiner

*Primary Examiner* — Robert W Horn
(74) *Attorney, Agent, or Firm* — Mark W Handley

(57) ABSTRACT

A tuning device with a time display is disclosed. The tuning device has a vibration sensor, a microprocessor, machine readable memory, and a display. A computer program stored in the machine readable memory for executing with the microprocessor to analyze audio frequency signals to determine musical pitch and error information for the detected audio frequency, and display both the time of day and the musical pitch and error information. A display has two display areas, one for display of the musical pitch and error information, and another for alternating display of the time of day and an A-reference setting. User inputs are provided for selecting among several user session modes, including a continual time of day display mode, or a tuning information mode, and a timer display mode. A clamp is provided for mechanically mounting the tuning device to a musical instrument and transmitting acoustic vibrations.

23 Claims, 5 Drawing Sheets

TIME DISPLAY FOR A TUNING DEVICE

TECHNICAL FIELD OF THE INVENTION

The present disclosure relates in general to electronic devices with musical application, herein referred to as musical electronics, and in particular to a musical electronics system and a display method.

BACKGROUND OF THE INVENTION

Stringed musical instruments such as the guitar require frequent tuning during practice and performance. Instrument tuners of various forms have existed for decades. Typically, modern tuning devices compare the audio frequency output of a musical instrument to a set of standard musical pitches, and provide feedback to the user to increase or decrease the pitch of the instrument. When the audio frequency output of the instrument matches a standard pitch to within some range of tolerance, the instrument is considered to be in tune.

Modern tuning devices are often physically attached to the musical instrument via a mechanical clip. This type of tuning device is commercially and herein referred to as a clip-on instrument tuner. Because of the need to physically attach the clip-on instrument tuner to the instrument, there is market pressure to design clip-on instrument tuners to be as small as possible. However, clip-on instrument tuners have a display that must be read by a human operator, often under low light and other adverse performance conditions, and thus there is a limit to continuous reduction in display size. These conflicting requirements lead to a scarcity of display space within clip-on instrument tuners.

Musical performers often wish to know the time of day when performing. Wrist worn timepieces have long been known, but a musical performer will be required to turn their wrist and view the face of the timepiece, a movement and action considered socially unacceptable under certain performance conditions. Similarly, it is also often socially unacceptable to turn and view the time on a clock when performing.

In view of this, the present disclosure aims to provide a system and a method that are able to solve the foregoing problems.

SUMMARY OF THE INVENTION

A novel time display for a tuning device is disclose, providing a system and a method for multiplexing time of day information with detected tuning information to make optimal use of scarce display resources in an instrument tuner. The tuning device preferably includes a vibration sensor which emits a signal in response to applied audio frequency vibrations, and the emitted signal corresponds to the applied audio frequency of the vibrations. A microprocessor is provided coupled to machine readable memory. An interface circuit is connected between the vibration sensor and the microprocessor for applying the signal emitted from the vibration sensor to the microprocessor. A computer program stored in the machine readable memory for executing with the microprocessor to analyze the signal corresponding to the audio frequency to determine musical pitch and error information for the detected audio frequency. The computer program also determines a time of day, and then provides a display signal which contains the musical pitch and error information, and the time of day.

A display is provided having at least two display areas. The first area is for display of the musical pitch and error information. The second display area is for display of the time of day. The display signal from the microprocessor causes display the musical pitch and error information in the first area and the time of day in the second area. Also displayed in the second area is an A-Reference setting, alternating with display of the time of day. User interface buttons are provided for selecting between display of the time of day and display of the musical pitch and error information. The user interface also preferably has an additional button for selecting an automatic mode, in which the display shows the time of day until the audio frequency vibrations are detected and then the musical pitch and error information for the audio frequency vibrations are shown for a selected period of time. The selected period of time is a predetermined time interval, at the end of which the time of day is displayed for a selected time interval, after which the musical pitch and error information of a then detected audio frequency vibrations are displayed. The tuning device preferably includes a clamp for mechanically mounting the tuning device to a musical instrument. In other embodiments, the tuning device is located within an enclosure capable of being mounted in a recess in the body of a musical instrument.

A computer program is stored in the machine readable memory for operating on one or more microprocessors provided in a microcontroller of the tuning device, or musical instrument tuner. Preferably the computer program includes method of display for the musical instrument tuner which includes steps of detecting the presence or absence of an audio frequency signal, activating a time of day display indication in the absence of the audio frequency signal, and activating a tuning information display indication in the presence of said audio frequency. The computer programs receives user inputs for selecting among several user session modes, such as an automatic display session mode in which either tuning information for a detected audio frequency signal is displayed or in the absence of an audio frequency signal the time of day is displayed, a fixed time display session mode during which the time of day is continuously displayed, a fixed reference display session mode during which a reference frequency used to derive the tuning figure of merit is continuously displayed, an elapsed time display session mode in which counting time transpired since the time of a user input event is displayed, and a countdown timer display session mode during which is displayed a period of time remaining in a selected period of time. Additionally, the time of day and at least part of the tuning information may be alternatively displayed according to preselected time intervals.

DESCRIPTION OF THE DRAWINGS

For a more complete understanding of the present disclosure and the advantages thereof, reference is now made to the following description taken in conjunction with the accompanying Drawings in which FIGS. 1 through 5B show various aspects for a time display for a tuning device devices made according to the present disclosure, as set forth below:

FIG. 1 is a block diagram of the tuning system having a time display according to the preferred embodiment of the present disclosure;

FIG. 2 is a flow chart of a time display method according to an embodiment of the present disclosure illustrated in FIG. 1;

FIG. 3 shows the display of the tuning device according to the preferred embodiment of the present disclosure;

FIGS. 5A, and 5B illustrate use condition variants of the display of the tuning system according to the preferred embodiment of the present disclosure.

DETAILED DESCRIPTION OF THE INVENTION

In the following description, the various embodiments of the present disclosure will be described in detail. However, such details are included to facilitate understanding of the disclosure and to describe the preferred embodiment of the disclosure. Such details should not be used to limit the disclosure to the particular embodiments described because other variations and embodiments are possible while staying within the scope of the disclosure. Furthermore, although numerous details are set forth in order to provide a thorough understanding of the disclosure, it will be apparent to one skilled in the art that these specific details are not required to practice the disclosure. In other instances, details such as well-known methods, electrical circuits, processes, and interfaces are illustrated in block diagram form so as to not obscure the present disclosure. Furthermore, aspects of the disclosure may be implemented in hardware, software, firmware, or a combination thereof.

Figure 1:
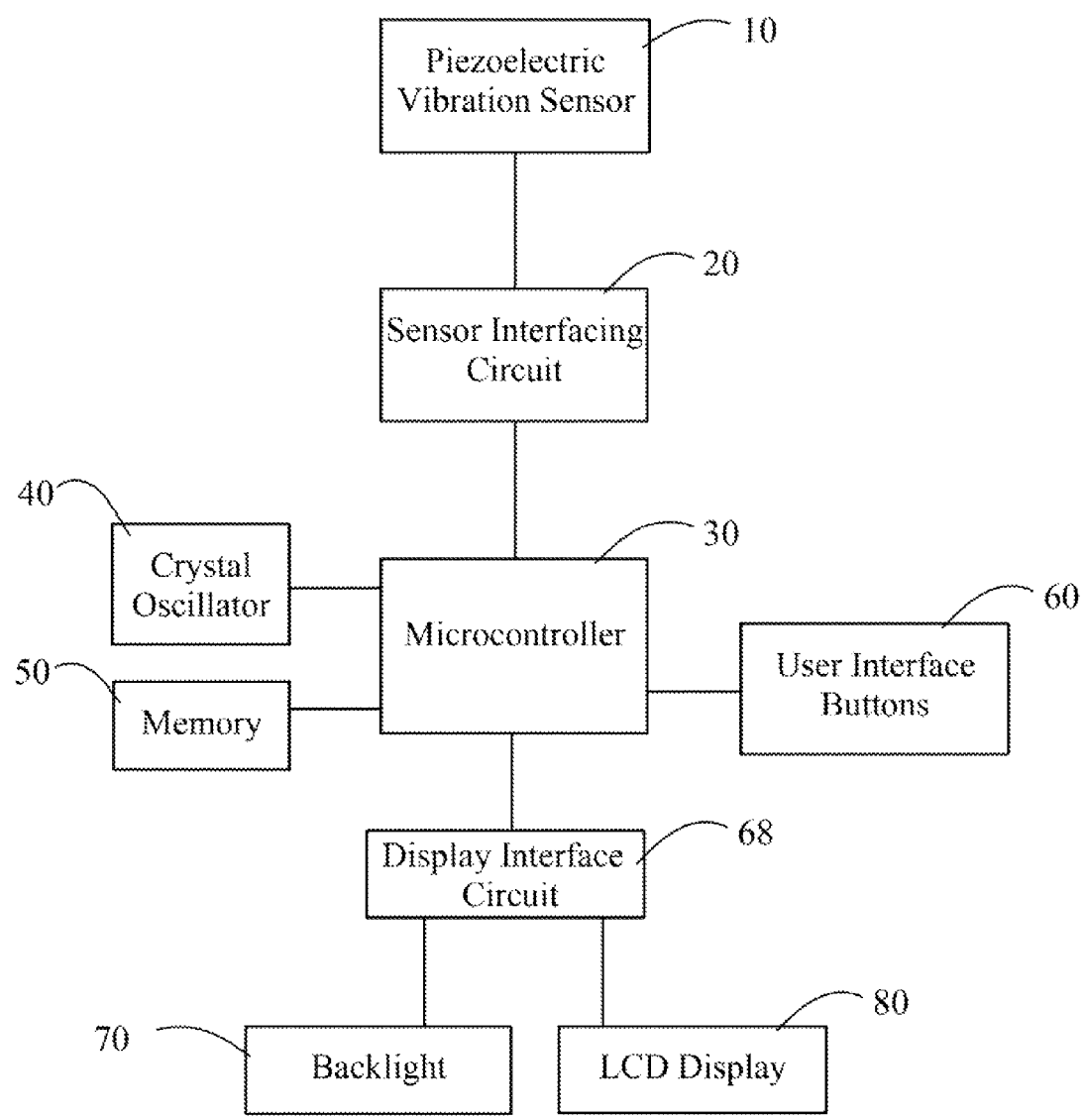

With reference now to the figures, FIG. 1 is a block diagram of the tuning system according to the preferred embodiment of the disclosure. As shown in FIG. 1, Piezoelectric Vibration Sensor 10 senses the audio frequency vibrations of a musical instrument. The Piezoelectric Vibration Sensor 10 may be integrated on a printed circuit board, attached to the system enclosure, embedded in an instrument, or other structure capable of receiving audio frequency vibrations of a musical instrument. The output of the Piezoelectric Vibration Sensor 10 is an electrical signal representative of the audio frequency vibrations of the musical instrument. It is foreseeable that Piezoelectric Vibration Sensor 10 may be provided by a piezoelectric ribbon, or in other embodiments other types of vibration sensors may be used, such as micro-electro-mechanical sensor, a magnetic inductive pickup or other vibration sensing technology without departing from the scope of the present disclosure. The electrical signal received from the Sensor 10 is conveyed to the Microcontroller 30 via a Sensor Interface Circuit 20. The Sensor Interface Circuit 20 may be one or more circuit board traces, conductive wire, a buffer amplifier, a limiting amplifier, an analog filter network, or other structure designed to convey an electrical signal from the Sensor 10 to a Microcontroller 30.

The Microcontroller 30 provides a microprocessor which controls the tuning system. The Microcontroller 30 receives and interprets the electrical signal received from the Sensor Interface Circuit 20. The Microcontroller 30 uses a Crystal Oscillator 40 and Memory 50 to execute a program implementing the method of the disclosure. The computer program for performing the method discussed below in reference to FIG. 3 is stored in the memory 50 and is executed by the Microcontroller 30. The Memory 50 is machine readable memory which may be external to, internal, or otherwise integrated with the Microcontroller 30. The User Interface Buttons 60 provide external user input to the Microcontroller 30 for configuration and selection of user session modes, such as shown in steps 110, 120 and 130 of FIG. 2, as well as other system settings. The User Interface Buttons 60 may be implemented with momentary contact switches, capacitive touch sensors, or other device capable of detecting user input. The Microcontroller 30 indicates the various conditions of the method of the disclosure on LCD Display 80, which may be backlit with Backlight 70 for viewing in low-light conditions. A Display Interface Circuit 68 connects between the Microcontroller 30 and the Backlight 70 and the LCD Display 80. The Microcontroller 30 applies to the Display Interface Circuitry 68 a display signal which contains the time of day information and tuning information, such as the closest musical pitch and the pitch error information. The musical pitch and the pitch error information each may be applied to provide tuning figures of merit. The Display Interface Circuitry applies receives the display signal and controls the Display 80 to show the time of day and tuning information. An illustrative example embodiment of the LCD Display 80 is shown as display 200 in FIG. 3.

Figure 2:
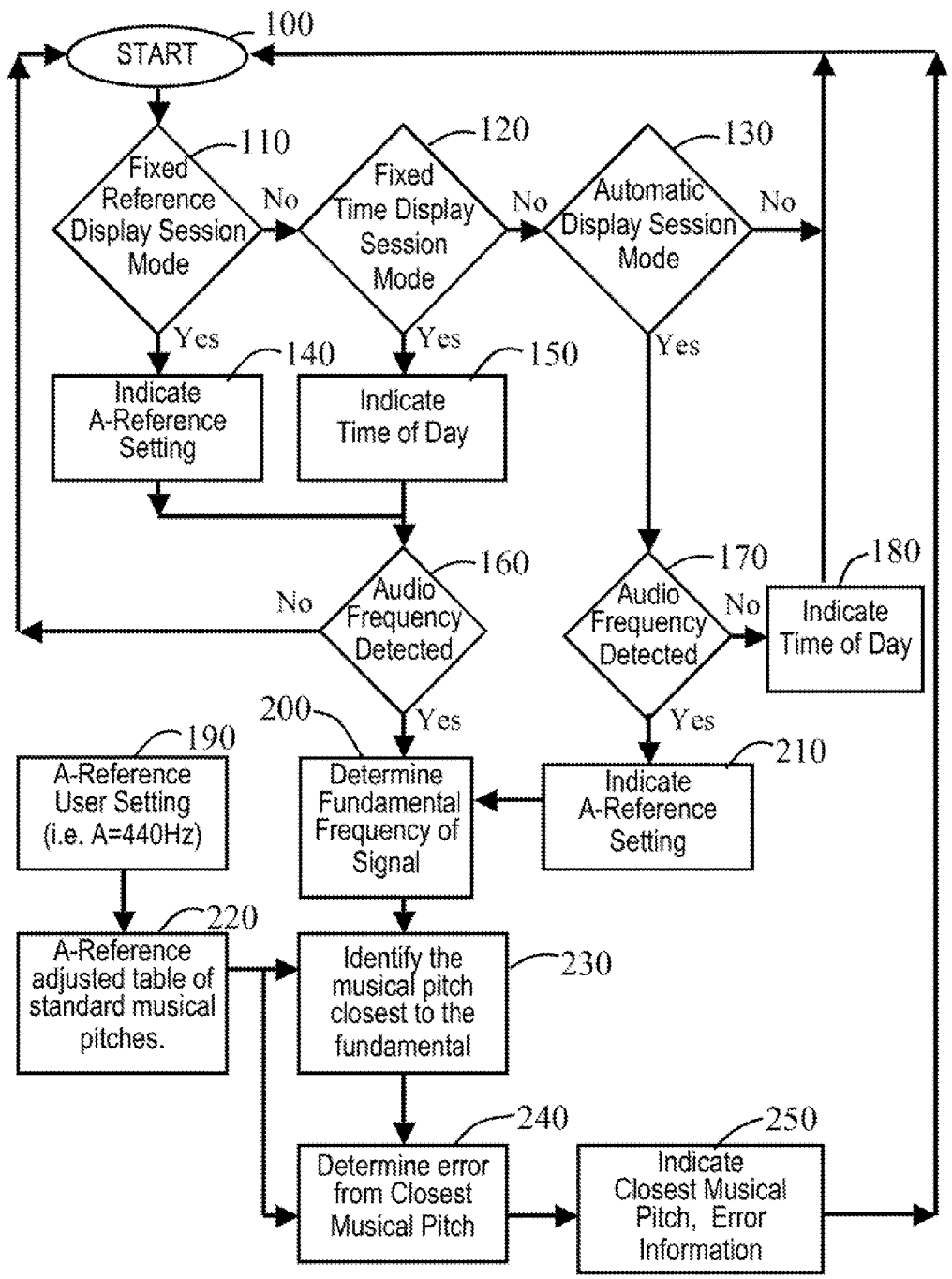
Figure 3:
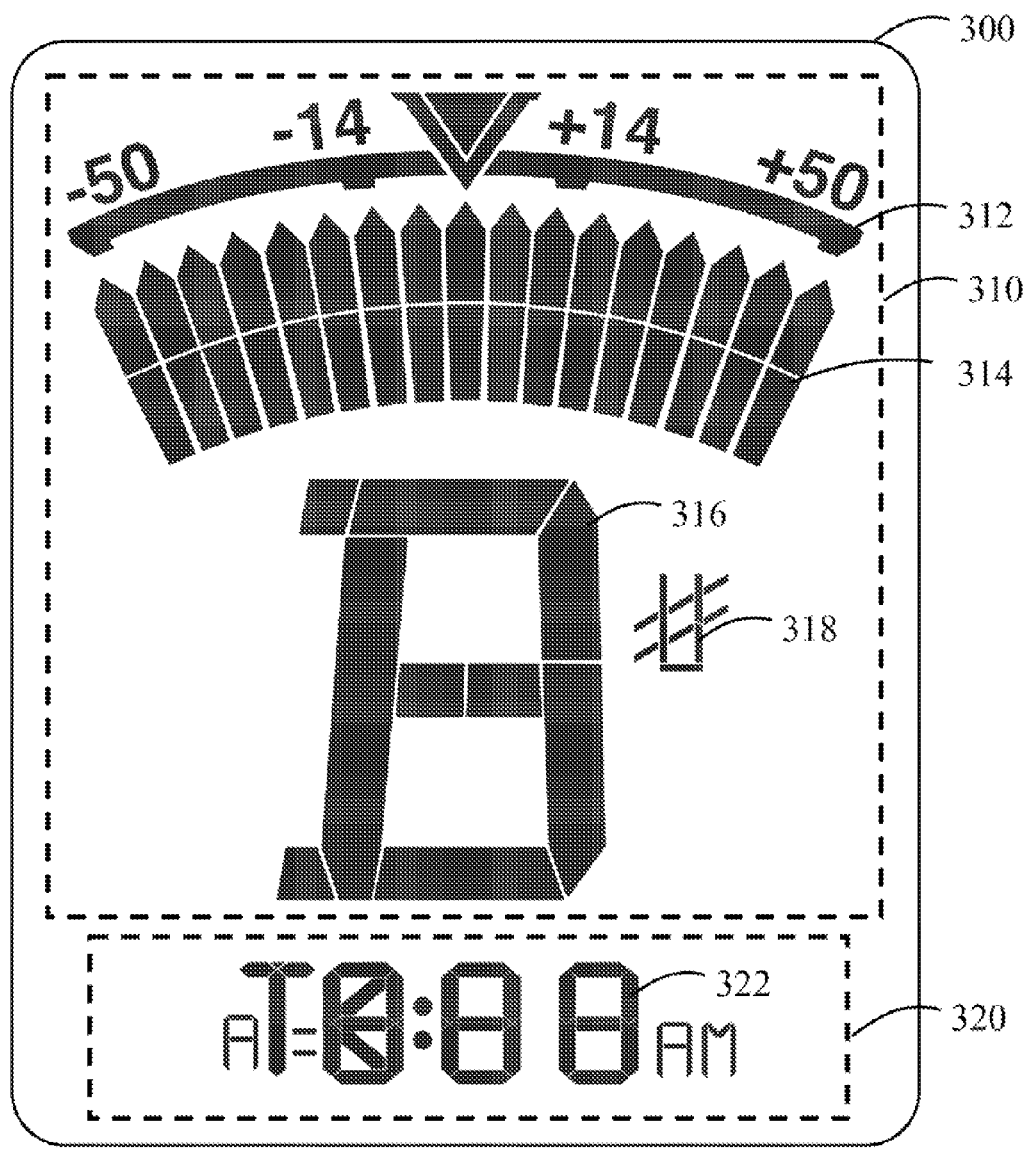

FIG. 2 is a block diagram of a time display method according to an embodiment of the present disclosure as illustrated in FIG. 1. As illustrated in FIG. 2, upon the application of electrical power or initiation of use, the tuning system enters the START 100 condition. Then, the tuning system initiates a user session mode by evaluation of user settings in steps 110, 120, and 130.

If the Automatic Display Session Mode is enabled for step 130, the process proceeds through the Yes branch of step 130 to the step 170 in which the tuning system further evaluates the presence of an Audio Frequency from the sensor interfacing circuit 20 and the vibration sensor 10 (shown in FIG. 1). If no Audio Frequency is detected by the tuning system (the No branch of step 170), the system proceeds to step 180 and indicates the Time of Day on the system LCD Display 80 (shown in FIG. 1). The tuning system then returns to the START 100 condition and periodically evaluates the selected Display Session Modes of the steps 110, 120 and 130. If an Audio Frequency is detected by the tuning system (the Yes branch of step 170), the system proceeds to step 210 and indicates the A-Reference Setting on the system LCD Display 80 in the display area 320 (shown in FIGS. 3 and 4A-4D). The tuning system then proceeds to analyze the detected Audio Frequency signal by determining the fundamental frequency of the signal in step 200. Once the fundamental frequency is determined, the tuning system identifies the musical pitch closest to the fundamental frequency in step 230, using a table of standard musical pitch frequencies 220 adjusted to the current A-Reference User Setting 190. The identification of musical pitch closest to the fundamental frequency may also be calculated on-demand based on mathematical formulas in place of using a lookup table of step 220. The closest musical pitch determination may include a musical note (i.e. A, B, C, etc.), an octave number (i.e. 1, 2, etc.), and a frequency (i.e. 220 Hertz). The tuning system then determines the error from the closest musical pitch in step 240, adjusting for the A-Reference User Setting 190. The error may be determined in cents (i.e. −12 cents), in Hertz (i.e. 2.4 Hz), or other musical error metric. The tuning system then indicates the closest musical pitch and error information in step 250 on the system LCD Display 80, which is shown in display area 310 of FIGS. 3 and 4A-4D. The tuning system then returns to the START 100 condition and periodically evaluates the selected Display Session Modes 110, 120 and 130.

If in step 110 it is determined that the Fixed Reference Display Session Mode is enabled, the process proceeds from step 110 through the Yes branch of step 110, and the tuning system indicates the A-Reference Setting on the system LCD Display 80 in the display area 320 of FIGS. 3 and 4A-4D. The tuning system then evaluates the Audio Signal in step 160. If no Audio Frequency is detected in step 160 the process proceeds through the No branch of step 160), and the tuning system then returns to the START 100 condition and periodically evaluates the selected Display Session Modes 110, 120 and 140. If an Audio Frequency is detected by the tuning system in step 160, the process proceeds through the Yes branch of step 160 and the system proceeds to indicate the A-Reference Setting on the system LCD Display 80 in the display area 320. The tuning system then proceeds to step 200 and analyzes the Audio Frequency signal by determining the fundamental frequency of the detected Audio Frequency signal. Once the fundamental frequency has been found, in step 230 the tuning system identifies the musical pitch closest to the said fundamental frequency using a table of standard musical pitch frequencies 220 adjusted to the current A-Reference User Setting 190. The identification of musical pitch closest to the fundamental frequency of step 230 may also be calculated on-demand based on mathematical formulas in place of using a lookup table of step 220. The closest musical pitch determination may include a musical note (i.e. A, B, C, etc.), an octave number (i.e. 1, 2, etc.), and a frequency (i.e. 220 Hertz). The tuning system then determines the error from the closest musical pitch in step 240, adjusting for the A-Reference User Setting 190. In step 240 the error may be determined in cents (i.e. −12 cents), in Hertz (i.e. 2.4 Hz), or other musical error metric. The tuning system then indicates the closest musical pitch and error information in step 250 on the system LCD Display 80 in the display area 310. The closest musical pitch, the error information, and the A-Reference are each displayed to provide tuning figures of merit. The tuning system then returns to the START 100 condition and periodically evaluates the selected Display Session Modes 110, 120 and 130.

If in step 120 the Fixed Time Display Session Mode is enabled, the process proceeds through the Yes branch from step 120 and the tuning system indicates the Time of Day on the system LCD Display 80 in display area 320. The tuning system then evaluates the Audio Signal in step 160 and if no audio signal is detected the process proceeds back to the START step 100. If an Audio Signal is detected in step 160 the process proceeds to the step 200 and the fundamental frequency of the signal is determined and the process proceeds as described herein-above. In some embodiments, a user input is provides which may be selected so that only the time of day is selected, whether or not an audio signal is detected. In yet other embodiments, the display area 320 may alternate between displaying the A-Reference setting and the time of day for preselected periods of time when an audio signal is detected.

With reference now to FIG. 3, a side elevation view illustrates a display 300 of the tuning device according to the preferred embodiment of the present disclosure, which corresponds to Display 80 of FIG. 1. The display 300 in the preferred embodiment of the disclosure is a LCD display with two primary areas 310 and 320, which are shown in FIG. 3 with all LCD segments darkened. The first display area 310 is used for the indication of tuning information. The display area 310 contains a scale 312 at the top, a plurality of positions 314 for a simulated needle, a note name indicator 316, and a sharp/flat indicator 318. The second area 320 of the display is a multi-purpose area with digits 322 used for both the indication of the user A-Reference Setting (i.e. "A=440") and the indication of the Time of Day (i.e. "12:03 pm"). In at least one variant of the disclosure, the available user sessions may be limited to the Fixed Time Display Session Mode and tuning information display area 310 may or may not be utilized. In such variants, additional timekeeping modes such as elapsed time and countdown timer operations utilize the shared display indicators 320 to further the utility of the disclosure.

Figure 4A:
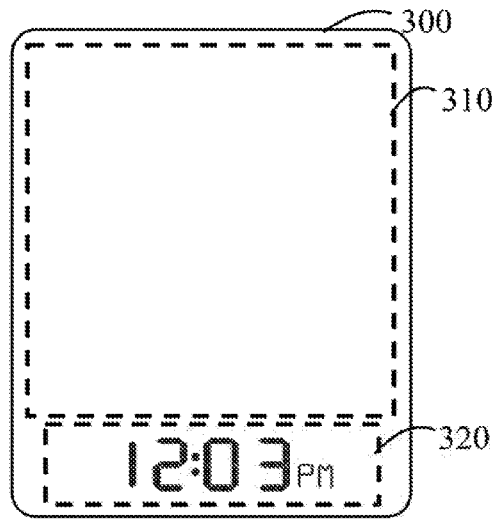
FIGS. 4A, 4B, 4C, and 4D illustrate variants of the display of the tuning system according to the preferred embodiment of the present disclosure.
Figure 4B:
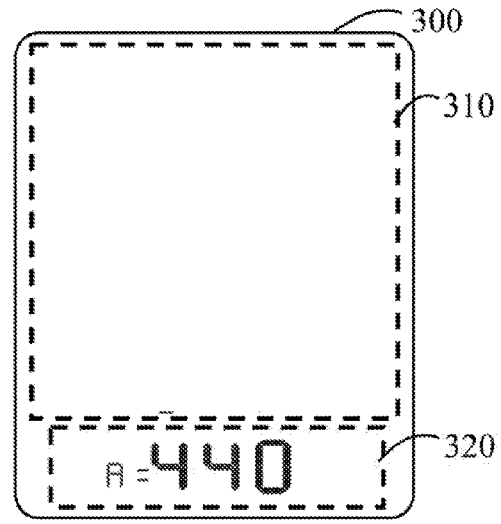
Figure 4C:
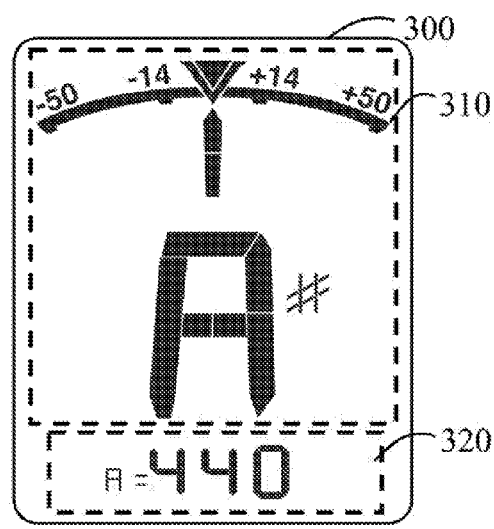

With reference now to FIGS. 4A, 4B, 4C, and 4D, variants of the display 300 of the tuning system according to the preferred embodiment of the disclosure. FIG. 4A illustrates the display 300 as it shows the time of day in either of step 150 or step 180 of FIG. 2. FIG. 4B illustrates the display 300 as it implements step 210 of FIG. 2. The FIG. 4C illustrates the display 300 of the tuning system in step 250 of FIG. 2 in which the closes musical pitch and error information are indicated in the display area 310, and either of steps 140 or 210 of FIG. 2 in which the A-reference setting is indicated in display area 320.

Figure 4D:
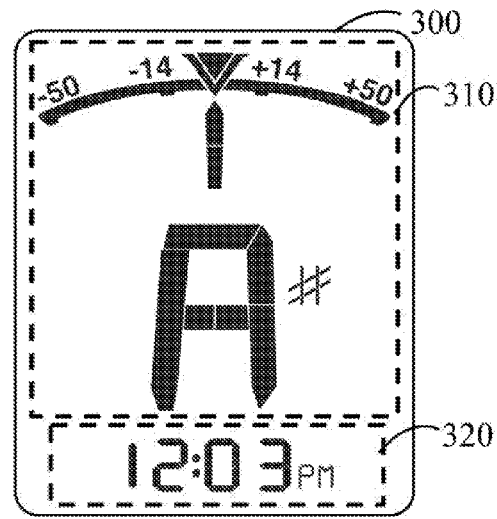

FIG. 4D illustrates an alternative embodiment with display of the tuning system in step 250 of FIG. 2, simultaneously with display of the time of day. In the embodiment of FIG. 4D, the display area 320 would preferably alternate between display of the time of day and the A-reference frequency. In yet still other embodiments of the present disclosure, the display area 320 would only show the time of day and not the reference A-reference frequency. In this mode, the tuning system would act as a clock mounted to the musical instrument for viewing by discretely viewing by the musician.

Figure 5A:
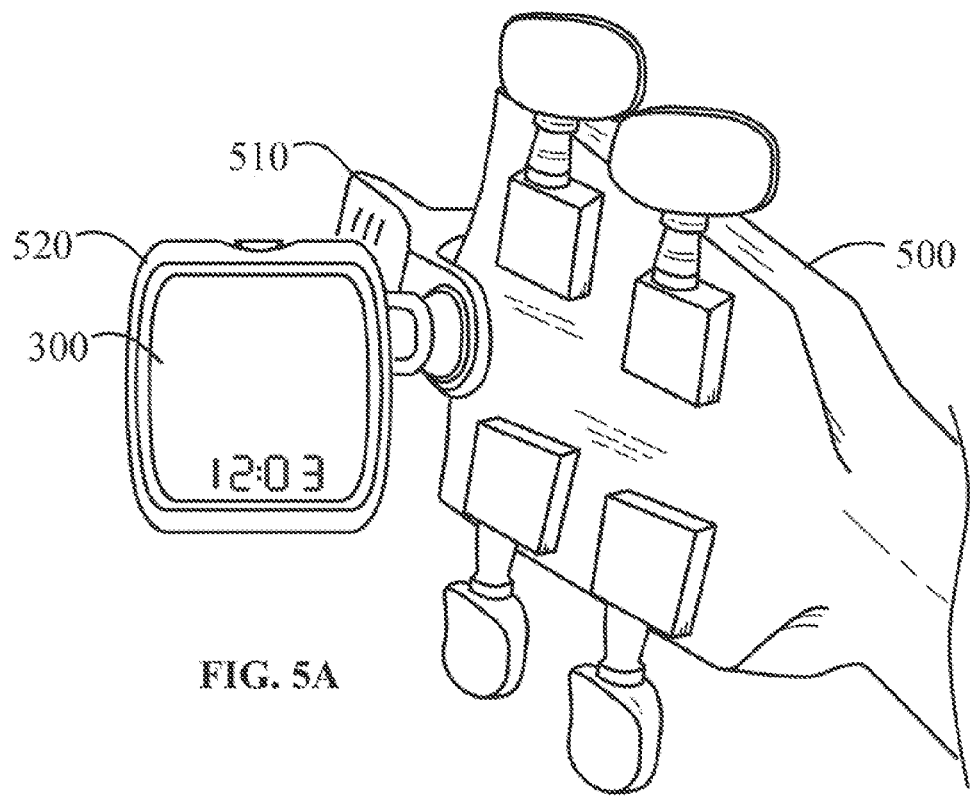
Figure 5B:
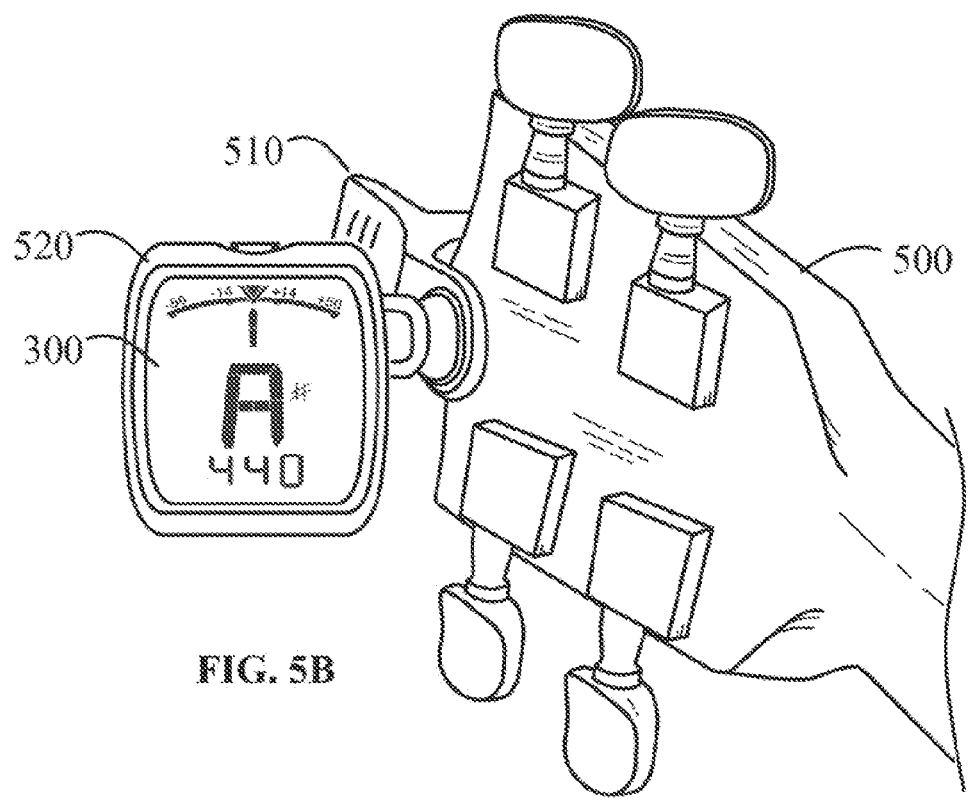

FIGS. 5A, and 5B illustrate use condition variants of the display of the tuning system according to the preferred embodiment of the disclosure. The tuning system housing 520 is attached to the headstock of a musical instrument 500 (in this illustration, a Ukulele) by means of a mechanical clip 510. Acoustic Frequency vibrations of the instrument 500 are conducted to the tuning system housing 520 via the mechanical clip 510. The tuning system Vibration Sensor 10 of FIG. 1 is enclosed in the tuning system housing 520 and senses the conducted Acoustic Frequency vibrations of the instrument 500. FIG. 5A illustrates the tuning system and the tuning system display 300 showing the time of day, which corresponds to the steps 150 and 180 of FIG. 2. The FIG. 5B illustrates the tuning system and the tuning system display 300 showing tuning information and the fundamental frequency, which corresponds to step 250 of FIG. 2.

The present disclosure provides advantages of a musical instrument tuner having a time of day display feature. The musical instrument tuner is preferably mounted to a musical instrument, such as the headstock of a stringed instrument. The mount transmits vibrations from the musical instrument to the vibration sensor, which then emits a detected signal which is processed and applied to a microprocessor. The microprocessor then analyzes the detected signal and determines a fundamental frequency for the detected signal and error information from the closes pitch to alert the user to adjust the instrument to correct for the pitch error. The musical instrument tuner further includes a feature for display of the time of day. The display area for display of the time of day is preferably shared with the detected tuning information to optimize use of the display area of the musical instrument tuner.

Although the preferred embodiment has been described in detail, it should be understood that various changes, substitutions and alterations can be made therein without departing from the spirit and scope of the disclosure as defined by the appended claims.

What is claimed is:

1. A tuning device comprising:
   a vibration sensor which emits a signal in response to applied audio frequency vibrations, wherein said signal corresponds to said audio frequency;
   a microprocessor coupled to machine readable memory;
   an interface circuit for applying the signal emitted from the vibration sensor to the microprocessor;
   a computer program stored in the machine readable memory for executing with the microprocessor to analyze said signal corresponding to said audio frequency and determine musical pitch and error information of said audio frequency, and said computer program further determining a time of day, and then providing a display signal which contains the musical pitch and error information, and the time of day;
   a display having a display area for display of the time of day and at least one of the musical pitch and error information in response to receiving the display signal; and
   said user interface having an additional button for selecting an automatic mode, in which the display shows the time of day until the audio frequency vibrations are detected and then the musical pitch and error information for the audio frequency vibrations are show for a selected period of time.

2. The tuning device according to claim 1, further comprising:
   an a-reference setting stored in machine readable memory; and
   wherein said microprocessor applies said reference to said display signal such that said a-reference setting is displayed, alternating with display of the time of day.

3. The tuning device according to claim 2, further comprising user interface buttons for selecting between display of the time of day, and display of the musical pitch and error information.

4. The tuning device according to claim 1, wherein said selected period of time is a predetermined time interval, at the end of which the time of day is displayed for a selected time interval, after which the musical pitch and error information of a then detected audio frequency vibrations are displayed.

5. The tuning device according to claim 1, further comprising a clamp for mechanically mounting the tuner to a musical instrument.

6. The tuning device according to claim 1, further comprising an enclosure capable of being mounted in a recess in the body of a musical instrument.

7. A tuning device comprising:
   a vibration sensor which emits a signal in response to applied audio frequency vibrations, wherein said signal corresponds to said audio frequency;
   a microprocessor coupled to machine readable memory;
   an interface circuit for applying the signal emitted from the vibration sensor to the microprocessor;
   a computer program stored in the machine readable memory for executing with the microprocessor to analyze said signal corresponding to said audio frequency and determine musical pitch and error information of said audio frequency, and said computer program further determining a time of day, and then providing a display signal which contains the musical pitch and error information, and the time of day;
   a display having at least two display areas, the first display area for display of the musical pitch and error information and the second display area for display of the time of day;
   wherein said display signal from said microprocessor is applied to said display to display the musical pitch and error information in the first display area and the time of day in the second display area;
   an a-reference setting stored in machine readable memory; and
   wherein said microprocessor applies said reference to said display signal such that said a-reference setting is displayed in said second area, alternating with display of the time of day.

8. The tuning device according to claim 7, further comprising user interface buttons for selecting between display of the time of day and display of the musical pitch and error information.

9. The tuning device according to claim 8, further comprising said user interface having an additional button for selecting an automatic mode, in which the display shows the time of day until the audio frequency vibrations are detected and then the musical pitch and error information for the audio frequency vibrations are show for a selected period of time.

10. The tuning device according to claim 9, wherein said selected period of time is a predetermined time interval, at the end of which the time of day is displayed for a selected time interval, after which the musical pitch and error information of a then detected audio frequency vibrations are displayed.

11. The tuning device according to claim 7, further comprising a clamp for mechanically mounting the tuner to a musical instrument.

12. The tuning device according to claim 7, further comprising an enclosure capable of being mounted in a recess in the body of a musical instrument.

13. A method of display for a musical instrument tuner, the method comprising the steps of:
   detecting the presence or absence of an audio frequency signal;
   activating a time of day display indication in the absence of said audio frequency signal; and
   activating a tuning information display indication in the presence of said audio frequency.

14. The method according to claim 13, further comprising the step of alternating display of the time of day indication and at least part of the tuning information according to preselected time intervals.

15. A method of display for a musical instrument tuning system, said method comprising the steps of:
   initiating a user session mode, selected among a set of user session modes;
   the set of user session modes comprising an automatic display session mode;
   when the user session mode is selected to be the automatic display session mode, establishing the presence of an audio frequency signal and indicating the reference frequency used to derive a tuning figure of merit and indicating the tuning figure of merit on a display; and
   when the user session mode is selected to be the automatic display session mode, establishing the absence of an audio frequency signal and indicating time of day on the display.

16. The method of display for a musical instrument tuning system according to claim 15, further comprising the steps of:
- shifting the session mode from one of the previously selected user session modes to a second user session mode in response to an input established by a user;
- the set of user session modes further comprising a fixed time display session mode;
- wherein the second user session mode is defined to be the fixed time display session mode, during which the time of day is continuously displayed on the system display; and
- continuously displaying the time of day on the system display.

17. The method of display for a musical instrument tuning system according to claim 15, further comprising the steps of:
- shifting the session mode from one of the previously selected user session modes to another user session mode in response to an input established by a user;
- the set of user session modes further comprising a fixed reference display session mode;
- wherein the fixed reference display session mode provides display of a reference frequency used to derive the tuning figure of merit continuously on the system display; and
  - wherein the input established by the user selected the fixed reference display session mode; and
- displaying the reference frequency on the system display.

18. The method of display for a musical instrument tuning system according to claim 15, further comprising the steps of:
- shifting the session mode from one of the previously selected user session modes to another user session mode in response to an input established by a user;
- the set of user session modes further comprising an elapsed time display session mode;
- wherein the elapsed time display session mode causes the system display to show a counting time transpired since the time of a user input event;
- wherein the input established by the user selected the elapsed time display session mode; and
- displaying the count of transpired time on the system display.

19. The method of display for a musical instrument tuning system according to claim 15, further comprising the steps of:
- shifting the session mode from one of the previously selected user session modes to another user session mode in response to an input established by a user;
- the set of user session modes further comprising a count-down timer display session mode;
- wherein the timer display session mode displays a counting down for a selectable period of time remaining to a zero time datum;
- wherein the input established by the user selected the timer display session mode; and
- displaying on the display a period of time remaining in a selected period of time.

20. A method of display for a musical instrument tuning system, said method comprising the steps of:
- initiating a user session mode which is selected among at least one user session modes;
- wherein said at least one session mode provides a fixed time display session mode;
- when the user session mode is selected to be the fixed time display session mode, establishing the presence of an audio frequency signal and indicating the reference frequency used to derive a tuning figure of merit and indicating the tuning figure of merit on a display; and
- continuously displaying the time of day on the system display.

21. The method of display for a musical instrument tuning system according to claim 20, further comprising the steps of:
- shifting the session mode from the at least one fixed time display session mode to a second user session mode in response to an input established by a user;
- the second user session mode providing a fixed reference display session mode;
- wherein the fixed reference display session mode provides display of a reference frequency used to derive the tuning figure of merit continuously on the system display; and
  - wherein the input established by the user selected the fixed reference display session mode; and
- displaying the reference frequency on the system display.

22. The method of display for a musical instrument tuning system according to claim 20, further comprising the steps of:
- shifting the session mode from one of the previously selected user session modes to an other user session mode in response to an input established by a user;
- the other user session mods further comprising an elapsed time display session mode;
- wherein the elapsed time display session mode causes the system display to show a counting time transpired since the time of a user input event;
- wherein the input established by the user selected the elapsed time display session mode; and
- displaying the count of transpired time on the system display.

23. The method of display for a musical instrument tuning system according to claim 20, further comprising the steps of:
- shifting the session mode from one of the previously selected user session modes to an other user session mode in response to an input established by a user;
- the other user session modes further comprising a count-down timer display session mode;
- wherein the timer display session mode displays a counting down for a selectable period of time remaining to a zero time datum;
- wherein the input established by the user selected the timer display session mode; and
- displaying on the display a period of time remaining in a selected period of time.

* * * * *